United States Patent [19]
Tanaka et al.

[11] 4,423,417
[45] Dec. 27, 1983

[54] CAPACITANCE TYPE DISTANCE DETECTING APPARATUS

[75] Inventors: Hiroaki Tanaka; Shigeyuki Akita, both of Okazaki, Japan

[73] Assignee: Nippon Soken, Inc., Nishio, Japan

[21] Appl. No.: 318,856

[22] Filed: Nov. 6, 1981

[30] Foreign Application Priority Data

Nov. 10, 1980 [JP] Japan .................................. 55-157807

[51] Int. Cl.³ .............................................. G08C 19/10
[52] U.S. Cl. .............................. 340/870.37; 324/61 R
[58] Field of Search ..................... 340/870.37, 347 P; 324/61 R; 318/662

[56] References Cited

U.S. PATENT DOCUMENTS 3,355,806  12/1967  Brook ............................. 340/870.37
3,702,467  11/1972  Melnyk ........................... 340/870.37
3,961,318   6/1976  Ferrand et al. ................. 340/870.37
4,029,579   5/1978  Weit ............................... 340/870.37

Primary Examiner—James J. Groody
Attorney, Agent, or Firm—Cushman, Darby & Cushman

[57] ABSTRACT

A capacitance type distance or position detecting apparatus includes a first fixed plate having first and second alternately arranged electrodes. A second plate which moves with a shaft has first, second, third and fourth alternately arranged electrodes in opposing relationship to the electrodes on the first plate. First and second travel distance signals are generated due to capacitance changes caused by changes in the opposed relationship between the electrodes on the first plate and the electrodes on the second plate. Logic operations are performed on the first and second travel distance signals to generate a display of distance of travel.

5 Claims, 26 Drawing Figures

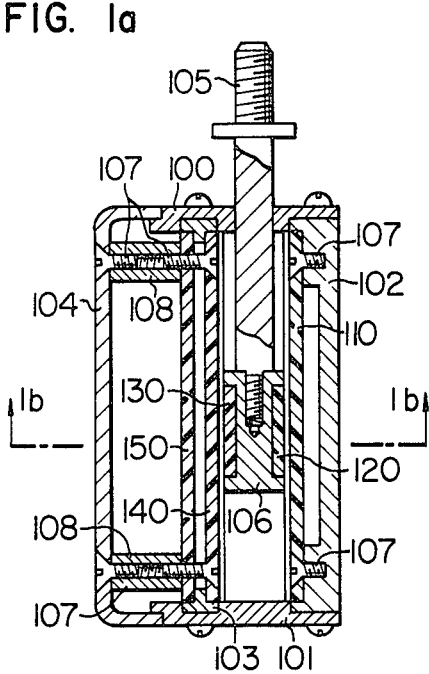
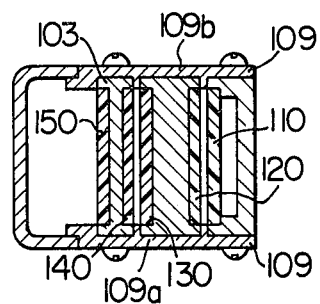
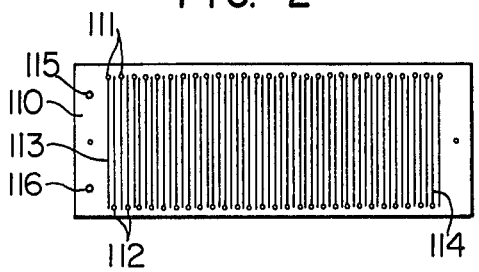
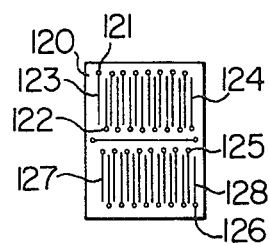
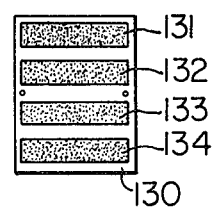
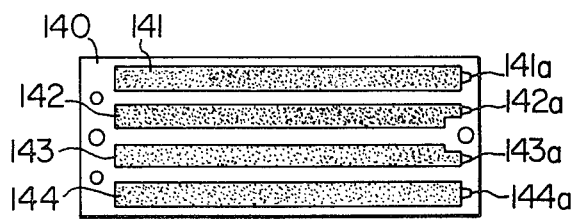

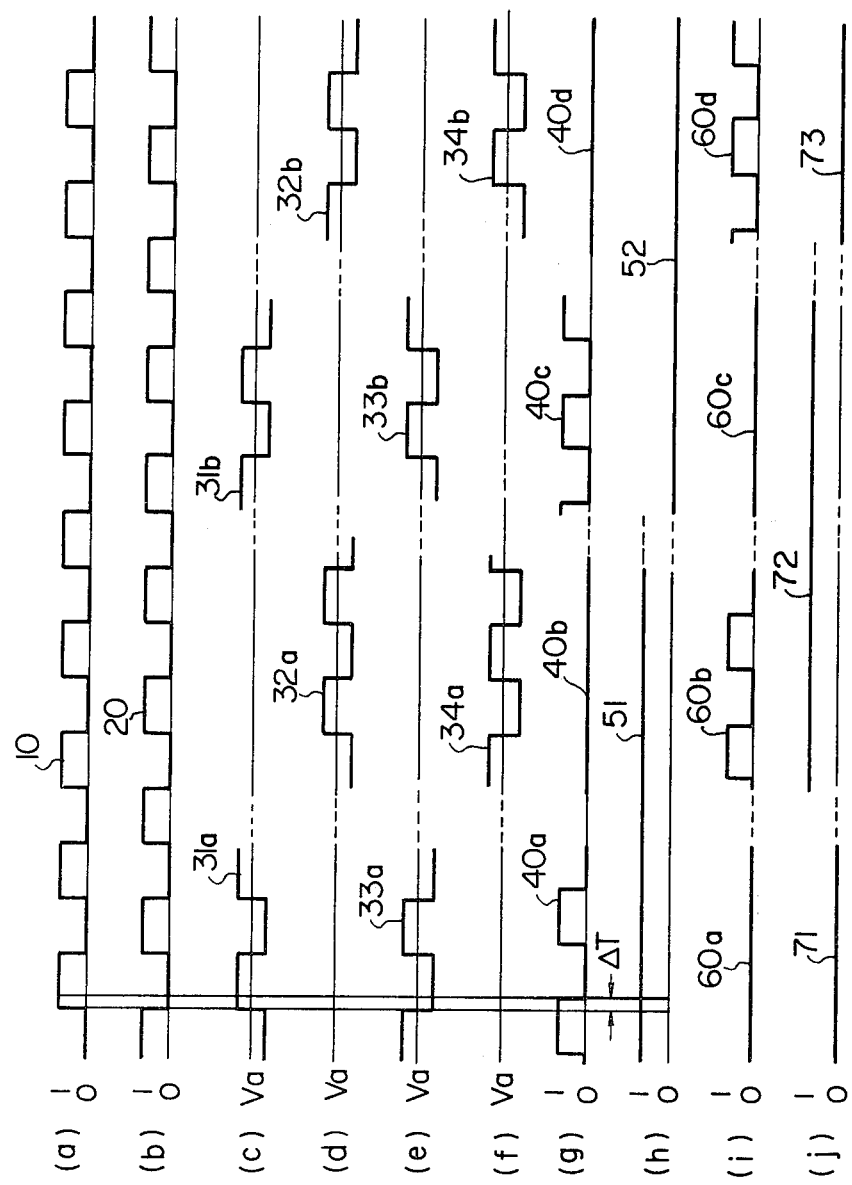

CAPACITANCE TYPE DISTANCE DETECTING APPARATUS

BACKGROUND OF THE INVENTION

The present invention relates to a capacitance type distance or position detecting apparatus responsive to the displacement of an object to measure the distance of movement of the object in the axial direction.

SUMMARY OF THE INVENTION

It is the object of the present invention to provide a capacitance type distance or position detecting apparatus comprising a first plate fixed in place, a second and third plate which are positioned opposite to the first plate and moved by the movement of a shaft and a fourth plate positioned opposite to the third plate, wherein the first plate includes input-side first and second electrodes which are alternately arranged at equal spaces, wherein the second plate includes first-output-side first and second electrodes which are alternately arranged at equal space opposite to the electrodes of the first plate and second-output-side third and fourth electrodes which are arranged to face the input-side first and second electrodes when the first-output-side first and second electrodes are not facing the input-side first and second electrodes, wherein the movement of the second plate causes the first electrodes of the first plate and the first-output-side electrodes of the second plate to face each other or the second electrodes of the first plate and the first-output-side electrodes of the second plate to face each other, whereby these two conditions are selectively detected at the first-output-side electrodes of the second plate in response to the pulse voltages (or ac voltages) opposite in phase and applied to the first and second electrodes of the first plate to generate a first travel distance signal detecting the movement of the second plate or alternatively the movement of the second plate causes the first electrodes of the first plate and the second-output-side electrodes of the second plate to face each other or the second electrodes of the first plate and the second-output-side electrodes of the second plate to face each other whereby these two conditions are selectively detected at the second-output-side electrodes of the second plate in response to the voltages applied to the input-side electrodes of the first plate to generate a second travel distance signal detecting the movement of the second plate, and wherein the distance of travel of the shaft is detected satisfactorily in response to the first and second travel distance signals.

BRIEF DESCRIPTION OF THE DRAWINGS

FIGS. 1a and 1b are sectional views showing an embodiment of the apparatus according to the present invention.

FIG. 2 is a front view of the first plate in the apparatus according to the invention.

FIG. 3 is a front view showing the surface of the second plate facing the first plate in the apparatus of the invention.

FIG. 4 is a front view of the third plate in the apparatus of the invention.

FIG. 5 is a front view showing the surface of the fourth plate facing the third plate in the apparatus of the invention.

FIGS. 8a–k show a plurality of signal waveforms useful for explaining the operation of the apparatus according to the invention.

DESCRIPTION OF THE PREFERRED EMBODIMENTS

Figure 6:
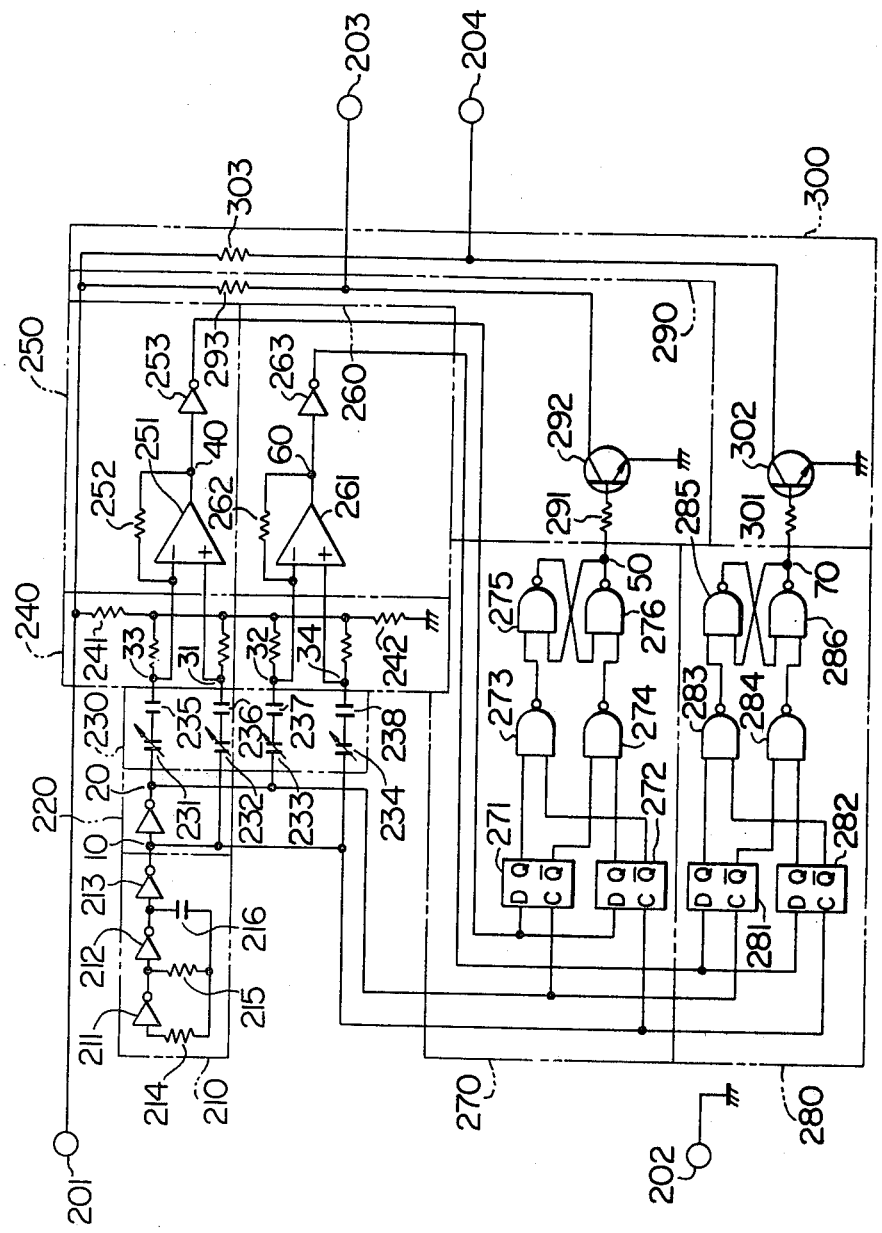
FIG. 6 is a wiring diagram showing the detecting circuit section of the apparatus according to the invention.

The present invention will now be described in greater detail with reference to the illustrated embodiment.

FIG. 1a is a sectional view showing the construction of an embodiment of the detecting apparatus according to the invention. FIG. 1b is a sectional view taken along the line Ib—Ib of FIG. 1a. Numeral 100 designates a front panel, and 101 a back panel, holding an under panel 102 and an upper panel 103 apart by a predetermined spacing. Side panels 109 are secured to the under panel 102 and the upper panel 103. A first plate 110 is fastened to the under panel 102 by screws 107. A moving plate 106 is fitted in slots 109a and 109b of the side panels 109 so as to be moved along with the movement of a shaft 105. Secured to the moving plate 106 are a second plate 120 and a third plate 130 which are opposite to the first plate 110, and secured to the upper panel 103 is a fourth panel 140 which is opposite to the third plate 130. Numeral 150 designates a printed circuit board including a detecting circuit section. Numeral 104 designates a cover secured to the upper panel 103, the side panels 109, the front panel 100 and the back panel 101 by studs 108 and screws 107.

FIG. 2 is a front view showing the surface of the first plate 110 which is opposite to the second plate 120. Numerals 111 and 112 designate holes made through the first plate 110 and formed with connecting thin metal films for interconnecting the front and back sides of the first plate 110 electrically. Numerals 113 and 114 designate input-side first and second electrodes which are respectively connected to the holes 111 and 112 and alternately arranged at equal spaces.

FIG. 3 is a front view showing the surface of the second plate 120 which is opposite to the first plate 110. Numerals 121, 122, 125 and 126 designate holes having the same effect as the holes 111 and 112 and are respectively interconnected on the back surface. Numerals 123 and 124 designate first-output-side first and second electrodes which are arranged opposite to the first and second electrodes 113 and 114 of the first plate 110 and are each connected to one of the holes 121 or 122. Numerals 127 and 128 designate third and fourth electrodes which are each connected to one of the holes 125 or 126 and which are positioned so that they face the input-side first and second electrodes 113 and 114 when the first-output-side first and second electrodes 123 and 124 are not facing the first and second electrodes 113 and 114 .

FIG. 4 is a front view showing the surface of the third plate 130 facing the fourth plate 140. Numeral 131 designates a first electrode connected to the first electrodes 123 of the second plate 120, and 132 a second plate connected to the second electrodes 124 of the second plate 120. Numeral 133 designates a third electrode connected to the third electrodes 127 of the second plate 120, and 134 a fourth electrode connected to the fourth electrodes 128 of the second plate 120.

FIG. 5 is a front view showing the surface of the fourth plate 140 facing the third plate 130. Numerals 141, 142, 143 and 144 designate first, second, third and fourth electrodes respectively positioned opposite to the first, second, third and fourth electrodes of the third plate 130.

FIG. 6 is a wiring diagram of the detecting circuit section. In the Figure, a terminal 201 is a power supply terminal to which a fixed voltage $V_c$ is applied. Numeral 202 designates a grounding terminal. Numeral 210 designates a known type of CR oscillator circuit, and 220 a reference signal generating circuit. The CR oscillator circuit 210 and the reference signal generating circuit 220 form a periodic signal supply circuit. Numeral 230 designates a detecting unit comprising the electrodes 113, 114, 123, 124, 127, 128, 131, 132, 133, 134, 141, 142, 143 and 144, 240 a reference voltage circuit, 250 and 260 first and second comparison circuits, 270 and 280 first and second phase detecting circuits, and 290 and 300 travel distance output circuits. Numerals 203 and 204 designate output terminals. It is noted that the circuits 220 and 230 correspond only to those of FIGS. 7a and 7b, and the corresponding circuits of FIGS. 7c and 7d differ from the circuits 220 and 230 of FIG. 6.

With the construction described above, the operation of the detecting circuit section will now be described. In the Figure, the oscillation waveform 10 shown in (a) of FIG. 8 is generated by the oscillator circuit 210 comprising inverter gates 211, 212 and 213, resistors 214 and 215 and a capacitor 216. The oscillation waveform 10 is transmitted to the reference signal generating circuit 220 so that the signal of the same phase with the oscillation waveform 10 and the signal 20 of the opposite phase shown in (b) of FIG. 8 are generated. These signals 10 and 20 are respectively applied to the input-side first and second electrodes 113 and 114 of the first plate 110 as shown in FIGS. 7a to 7d. As the second plate 120 is moved, the first, second, third and fourth electrodes 123, 124, 127 and 128 of the second plate 120 are selectively opposed to the first and second electrodes 113 and 114 of the first plate 110 as shown in FIGS. 7a to 7d.

Figure 7A:
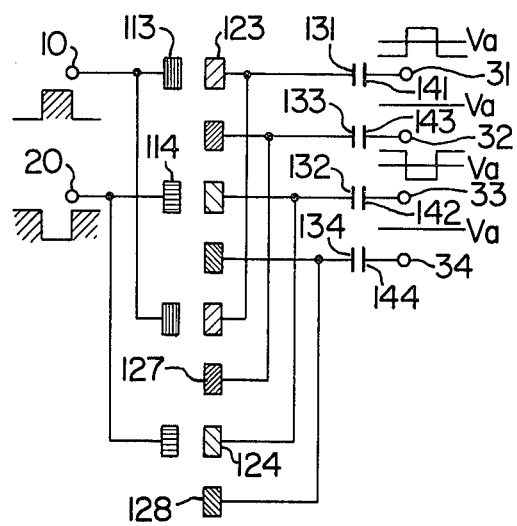
FIGS. 7a to 7d are circuit diagrams showing the positional relation of the electrodes caused by the movement thereof and useful in explaining the operation of the apparatus according to the invention.

The operation of the detecting circuit section will now be described with reference to a case where the shaft 105 (shown in FIG. 1) is moved so that the second plate 120 is moved thus positioning its first electrodes 123 opposite to the first electrodes 113 of the first plate 110 and its second electrodes 124 opposite to the second electrodes 114 of the first plate 110 as shown in FIG. 7a. Thus, when the signal of the same phase as the oscillation waveform 10 is applied to the first electrodes 113 of the first plate 110 by way of its holes 111, the signal of the same phase as the oscillation waveform 10 appears at the hole 121 shown in FIG. 3 from the capacitor (at 232 in FIG. 6) formed by the first electrodes 113 and the first electrodes 123 of the second plate 120 and it is transmitted as the signal 31a shown in (c) of FIG. 8 to the first comparison circuit 250 via a connector 141a from the capacitor (at 236 in FIG. 6) formed by the first electrode 131 of the third plate 130 and the first electrode 141 of the fourth plate 140. In the like manner, the signal 20 is transmitted to the second electrodes 114 of the first plate 110 via a hole 116 so that the signal of the same phase as the signal 20 is generated at the second electrodes 124 of the second plate 120 by way of the capacitor (at 231 in FIG. 6) formed by the second electrodes 114 of the first plate 110 and the second electrodes 124 of the second plate 120 and the signal is transmitted as the signal 33a shown in (e) of FIG. 8 to the first comparison circuit 250 via a hole 142a by way of the capacitor (at 235 in FIG. 6) formed by the second electrode 132 of the third plate 130 and the second electrode 142 of the fourth plate 140. The signals 31a and 33a are of the waveforms based on the voltage Va determined by resistors 241 and 242 of the reference voltage circuit 240 and shown in (c), (d), (e) and (f) of FIG. 8. The signals 31a and 33a are then subjected to differential amplification by the differential amplifier circuit formed by an operational amplifier 251 (hereinafter simply referred to as an OP AMP) and a resistor 252 of the first comparison circuit 250, thus generating on a signal line 40 a signal 40a of the waveform shown in (g) of FIG. 8 which is delayed from the oscillation waveform 20 by a time interval ΔT. The time interval ΔT represents the capacitor response delay time and the switching delay time of the OP AMP 251. The waveform of the signal 40a is reshaped by an inverter gate 253 and the resulting waveform of the opposite phase to the signal 40a is applied to the data terminals of D-type flip-flops 271 and 272 of the first phase detecting circuit 270. Also, the oscillation waveform 10 from the CR oscillator circuit 210 and the signal 20 of the opposite phase to the waveform 10 are respectively applied to the clock terminals C of the D-type flip-flops 272 and 271, so that the output terminal Q of the D-type flip-flop 271 goes to "1" and the output terminal Q of the D-type flip-flop 272 goes to "0." Thus, the "0" signal is generated on a signal line 50 by way of NAND gates 273, 274, 275 and 276. The signal is transmitted to the output circuit 290 so that a transistor 292 is turned off by way of a resistor 291 and a first travel distance signal "1" (the signal 51 shown in (h) of FIG. 8) is generated at the output terminal 203, the signal being indicative of the fact that the first electrodes 123 of the second plate 120 are opposite to the first electrodes 113 of the first plate 110 (or the second electrodes 124 of the second plate 120 are opposite to the second electrodes 114 of the first plate 110). At this time, the third and fourth electrodes 127 and 128 of the second plate 120 are not opposite to the electrodes of the first plate 110 and consequently no waveform appears at the third and fourth electrodes 143 and 144 of the fourth plate 140. As a result, no signal is generated on a signal line 60 (shown in FIG. 6) as shown at 60a in (i) of FIG. 8 so that a "1" signal is generated on a signal line 70 in FIG. 6 and a second travel distance signal of the "0" level (the signal 71 of FIG. 8) is generated at the terminal 204.

Figure 7B:
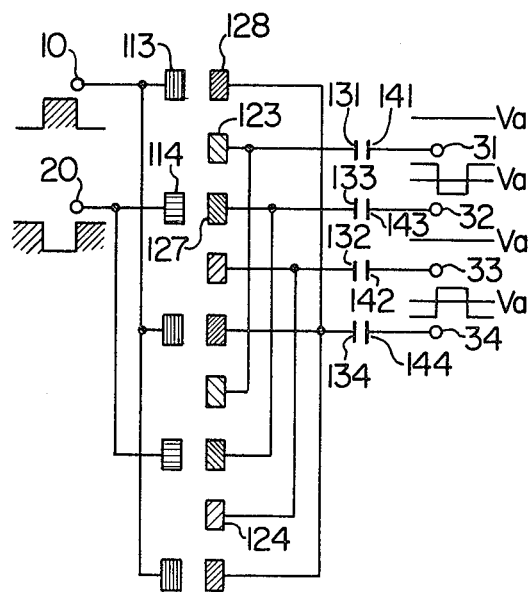
Figure 7C:
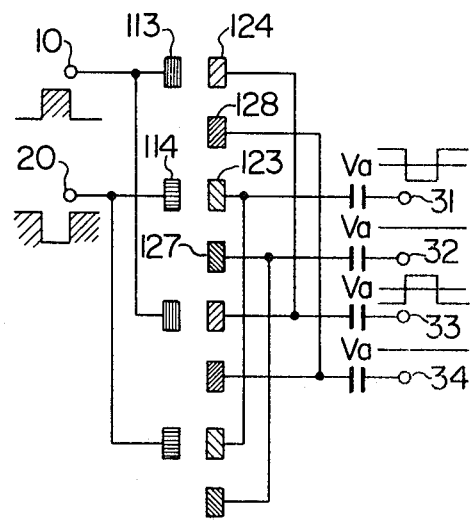
Figure 7D:
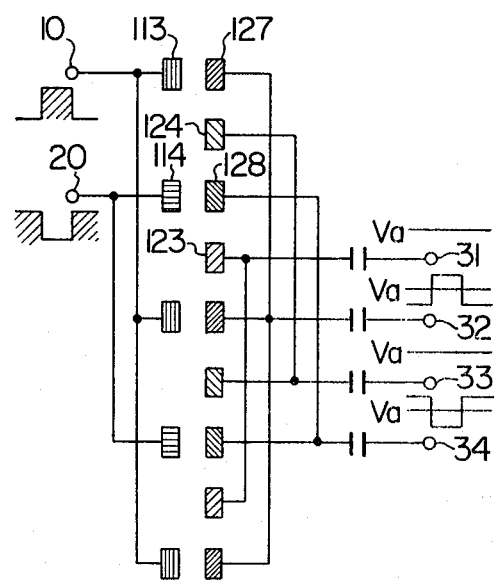

When the shaft 105 (shown in FIG. 1) is moved further so that as shown in FIG. 7b the fourth electrodes 128 of the second plate 120 are opposite to the first electrodes 113 of the first plate 110 and the third electrodes 127 of the second plate 120 are opposite to the second electrodes 114 of the first plate 110, the signal of the same phase as the signal 20 is generated at the third electrodes 127 of the second plate 120 and the signal 32a shown in (d) of FIG. 8 and based on the voltage Va as mentioned previously is generated at the third electrode 143 of the fourth electrode 140. Also, the signal of the same phase as the oscillation waveform 10 is generated at the fourth electrodes 128 of the second plate 120 and the signal 34a shown in (f) of FIG. 8 and based on the voltage Va is generated at the fourth electrode 144 of the fourth plate 140. When this occurs, a signal such as shown at 60b in (i) of FIG. 8 appears at the output terminal of the second comparison circuit 260 so that a "0" signal is generated at the output terminal of the second phase detecting circuit 280 and a second travel distance signal of the "1" level (the signal 72 shown in (j) of FIG. 8) is generated at the output terminal 204, the signal being indicative of the fact that the third electrodes 127 of the second plate 120 are opposite to the second electrodes 114 of the first plate 110. When the shaft 105 (FIG. 1) is moved further so that as shown in FIG. 7c the second electrodes 124 of the second plate 120 are opposite to the first electrodes 113 of the first plate 110 and the first electrodes 123 of the second plate 120 are opposite to the second electrodes 114 of the first plate 110, the signal of the same phase as the signal 10 is generated at the second electrodes 124 of the second plate 120 and the signal 31b shown in (c) of FIG. 8 and based on the voltage Va as mentioned previously is generated at the second electrode 142 of the fourth plate 140. Also, the signal 20 of the opposite phase to the oscillation waveform 10 is generated at the first electrodes 123 of the second plate 120 and the signal 33b shown in (e) of FIG. 8 and based on the voltage Va is generated at the first electrode 141 of the fourth plate 140. As a result, a signal as shown at 40c in (g) of FIG. 8 is generated at the output terminal of the first comparison circuit 250 and a "1" signal is generated at the output terminal of the first phase detecting circuit 280, thus generating at the output terminal 203 a first travel distance signal of the "0" level (the signal 52 shown in (h) of FIG. 8) indicating that the first electrodes 123 of the second plate 120 are opposite to the second electrodes 114 of the first plate 110.

When the shaft 105 (FIG. 1) is moved further so that as shown in 7d the third electrodes 127 of the second plate 120 are opposite to the first electrodes 113 of the first plate 110 and the fourth electrodes 128 of the second plate 120 are opposite to the second electrodes 114 of the first plate 110, the signal of the same phase as the signal 10 is generated at the third electrodes 127 of the second plate 120 and the signal 32b shown in (d) of FIG. 8 and based on the voltage Va as mentioned previously is generated at the third electrode 143 of the fourth plate 140. Also, the signal of the same phase as the signal 20 is generated at the fourth electrodes 128 of the second plate 120 and the signal 34b shown in (f) of FIG. 8 and based on the voltage Va is generated at the fourth electrode 144 of the fourth plate 140. As a result, a signal as shown at 60d in (i) of FIG. 8 is generated at the output terminal of the second comparison circuit 260 and a "1" signal is generated at the output terminal of the second phase detecting circuit 280, thus generating at the output terminal 204 a second travel distance signal of the "0" level (the signal 73 shown in (j) of FIG. 8) indicating that the third electrodes 127 of the second plate 120 are opposite to the first electrodes 113 of the first plate 110.

In this way, as the shaft 105 is moved so that the first, second, third and fourth electrodes 123, 124, 127 and 128 arranged on the second plate 120 pass over the first and second electrodes 113 and 114 arranged on the first plate 110, "1" and "0" signals are alternately generated at the output terminals 203 and 204, respectively. When the shaft 105 is moved in a given direction, "1" and "0" signals are alternately generated at the output terminals 203 and 204, respectively, in an overlapped relation as shown in (a) of FIG. 9. On the other hand, when the direction of movement of the shaft 105 is changed at a point A shown in (b) of FIG. 9, the signals generated at the output terminals 203 and 204 become as shown in (b) of FIG. 9. When the direction of movement of the shaft 105 is again changed at a point B shown in (c) of FIG. 9, the signals generated at the output terminals 203 and 204 become as shown in (c) of FIG. 9.

Next, the operation of digitally displaying the distance of travel of the shaft 105 in response to such signals will be described.

Figure 9:
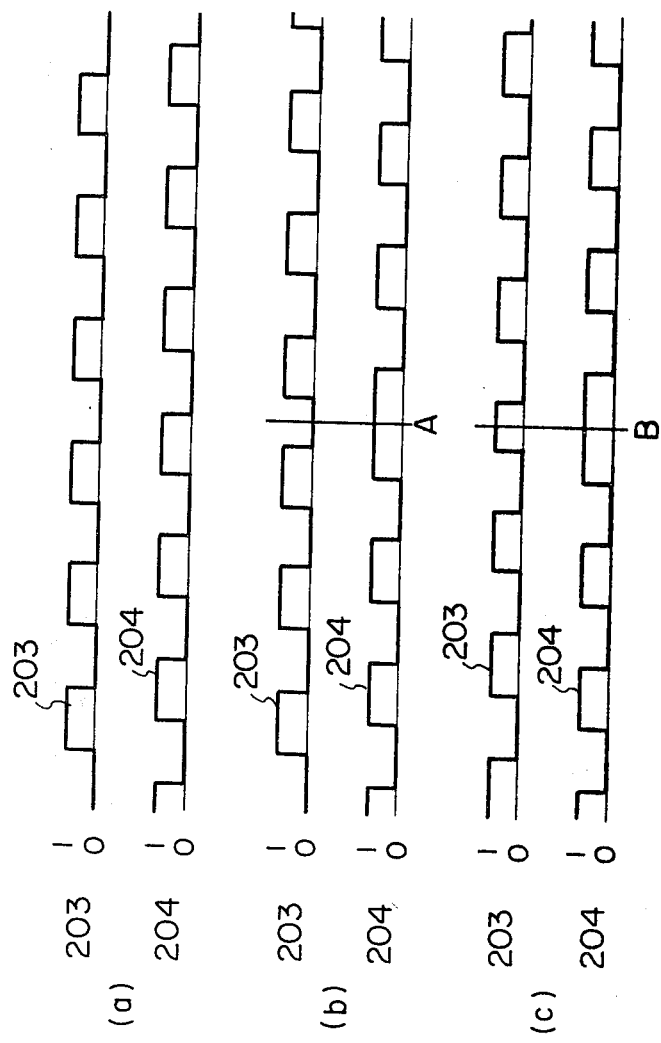
FIGS. 9a–c are signal waveform diagrams showing the states of output waveforms of the apparatus according to the invention.
Figure 10:
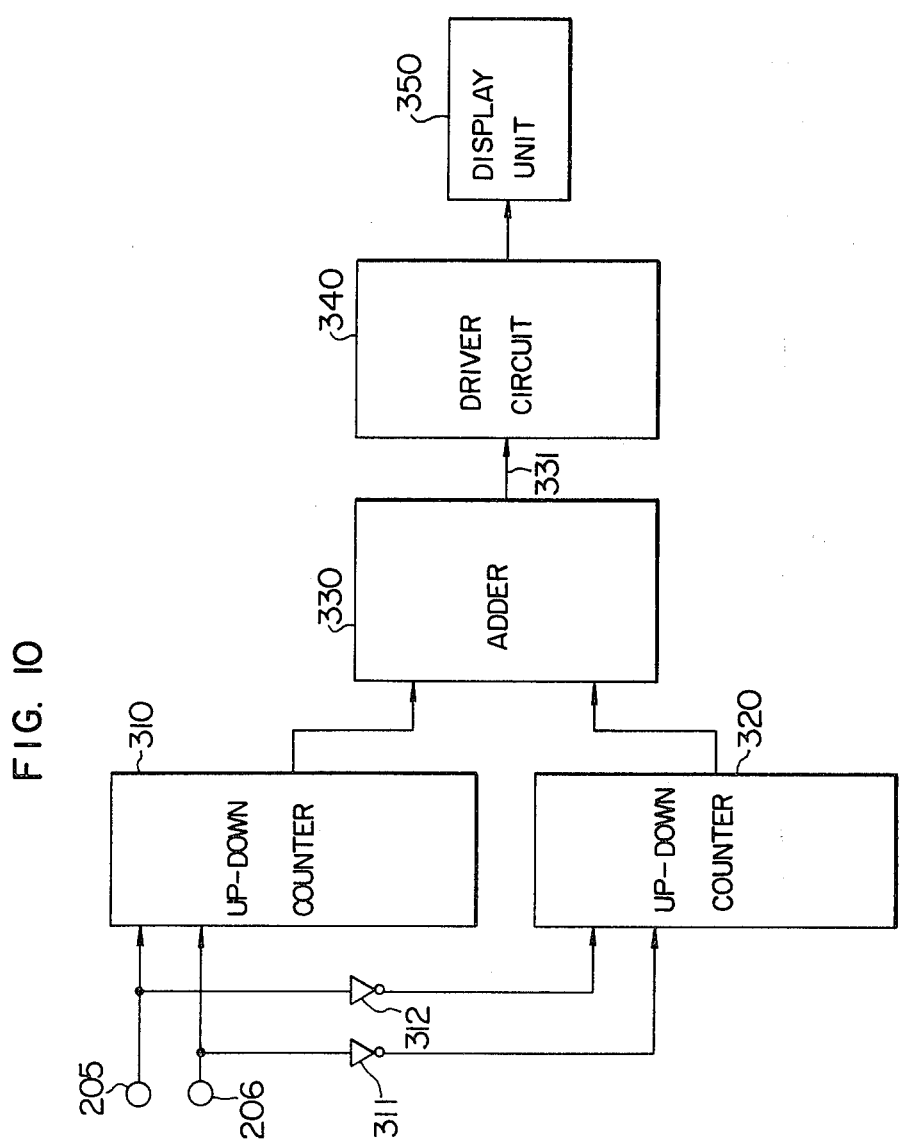
FIG. 10 is a block diagram of an arrangement responsive to the output signals of the apparatus of the invention to digitally display the distance of travel of the shaft.

FIG. 10 is a block diagram showing an embodiment of a digital display arrangement. In the Figure, terminals 205 and 206 are respectively connected to the output terminals 203 and 204 of FIG. 6. The terminal 205 is connected to the clock terminal of an up-down counter 310 and the terminal 206 is connected to the up/down terminal of an up down counter 310. The terminals 205 and 206 are also connected respectively to the clock and up/down terminals of the up-down counter 320 via inverter gates 312 and 311. Numeral 330 designates an adder, and 340 a driver circuit for a display unit 350. With the construction described, when the signals shown in (a) of FIG. 9 are applied to the terminals 205 and 206, the operation of the arrangement is as follows.

At the positive-going transition of the first travel distance signal 203 applied to the clock terminal of the up-down counter 310, the second travel distance signal 204 applied to the up/down terminal of the up-down counter 310 is always at "0" and the up-down counter 310 counts up in response to the positive-going transition of the signal 203. Since the signal of the opposite phase to the first travel distance signal 203 is applied to the clock terminal of the up-down counter 320 and the signal of the opposite phase to the second travel distance signal 204 is applied to the up/down terminal of the up-down counter 320, the up/down terminal is at "0" at the negative-going transition of the signal 203 and the up-down counter 320 counts up in response to the negative-going transition of the first travel distance signal 203. The output signals of the up-down counters 310 and 320 are applied to the adder 330 so that the resulting signal increased by one in response to the positive-going transition and negative-going transition, respectively, of the first travel distance signal 203 is generated on a signal line 331. By displaying such signal, it is possible to digitally display the distance travelled by the shaft 105.

On the other hand, where the signals shown in (b) of FIG. 9 are applied, with the point A at which the direction of movement of the shaft 105 is changed as a turning point, the up/down terminal of the up-down counter 310 goes from "0" to "1" in response to the positive-going transition of the first travel distance signal 203 and the up/down terminal of the up down counter 320 goes from "0" to "1" in response to the negative-going transition of the first travel distance signal 203, thus causing the counters 310 and 320 to count down. As a result, with the point A as a turning point, the digital display value displayed by the display unit 350 is decreased by one in response to the positive-going transition and negative-going transition, respectively, of each of the signals 203.

In the like manner, where the signals shown in (c) of FIG. 9 are applied, with the point B at which the direction of movement of the shaft 105 is changed as a turning point, the up/down terminals of the up-down counters 310 and 320 respectively respond to the positive-going transition and negative-going transition of the first travel distance signal 203 to go from "1" to "0" and thus the resulting signal increased by one in response to the positive-going transition and negative-going transition, respectively, of each of the signals 203 is again generated on the signal line 331.

We claim:

1. A capacitance type distance detecting apparatus comprising:
   a first plate including input first and second electrodes arranged alternately at equal spaces;
   a second plate including output side first and second electrodes alternately arranged at equal spaces opposite to said input first and second electrodes of said first plate and output side third and fourth electrodes alternately arranged at equal spaces opposite to said first and second electrodes of said first plate when said output side first and second electrodes are not opposite to said input first and second electrodes;
   means for relatively moving said electrodes in opposing relation in correspondence with a distance to be measured;
   a first comparison circuit for detecting a signal difference between first periodic signals generated at said output first and second electrodes of said second plate and generating an output signal;
   a second comparison circuit for detecting a signal difference between said first periodic signals generated at said output third and fourth electrodes of said second plate and generating an output signal;
   a computing circuit for supplying second periodic signals opposite in phase to said input first and second electrodes of said first plate at predetermined intervals, detecting a phase difference between said second periodic signals and said first comparison circuit output signal to generate a first distance signal when said first comparison circuit output signal is reversed in phase, detecting a phase difference between said second periodic signals and said second comparison circuit output signal to generate a second distance signal when said second comparison circuit output signal is reversed in phase, and performing a logical operation on said first and second distance signals.

2. A capacitance type distance detecting apparatus according to claim 1 wherein said computing circuit comprises:
   a periodic signal supply circuit for supplying said second periodic signals opposite in phase to said input first and second electrodes of said first plate at predetermined intervals;
   a first phase detecting circuit for detecting a phase difference between said second periodic signals and said first comparison circuit output signal to generate said first distance signal;
   a second phase detecting circuit for detecting a phase difference between said second periodic signals and said second comparison circuit output signal to generate said second distance signal; and
   a travel distance output circuit for detecting a phase difference between said first and second distance signals such that one of said distance signals is used as an addition/subtraction command signal and the other of said distance signals is increased or decreased in response to said addition/subtraction command signal whereby generating a signal corresponding to said distance to be measured.

3. A capacitance type distance detecting apparatus according to claim 1 wherein said moving means comprises a first fixed plate to which said first plate is secured, a moving plate disposed opposite to said first fixed plate and having said second plate secured to one surface thereof and a third plate secured to the other surface thereof, and a fourth plate secured to a second fixed plate to face said third plate.

4. A capacitance type distance detecting apparatus according to claim 3 wherein said third plate includes a first electrode connected to said first electrodes of said second plate, a second electrode connected to said second electrodes of said second plate, a third electrode connected to said third electrodes of said second plate, and a fourth electrode connected to said fourth electrodes of said second plate.

5. A capacitance type distance detecting apparatus according to claim 4 wherein said fourth plate includes a first, second, third and fourth electrodes respectively disposed opposite to said first, second, third and fourth electrodes of said third plate.

* * * * *